United States Patent
Deshpande et al.

(10) Patent No.: US 9,449,344 B2
(45) Date of Patent: Sep. 20, 2016

(54) DYNAMICALLY RETRAINING A PREDICTION MODEL BASED ON REAL TIME TRANSACTION DATA

(71) Applicants: Raghavendra Deshpande, Bangalore (IN); Vivek John Monteiro, Bangalore (IN); Shruthi A R, Arsikere (IN)

(72) Inventors: Raghavendra Deshpande, Bangalore (IN); Vivek John Monteiro, Bangalore (IN); Shruthi A R, Arsikere (IN)

(73) Assignee: SAP SE, Walldorf (DE)

( * ) Notice: Subject to any disclaimer, the term of this patent is extended or adjusted under 35 U.S.C. 154(b) by 315 days.

(21) Appl. No.: 14/138,135

(22) Filed: Dec. 23, 2013

(65) Prior Publication Data

US 2015/0178638 A1 Jun. 25, 2015

(51) Int. Cl.
*G06N 3/08* (2006.01)
*G06Q 40/00* (2012.01)
*G06Q 10/06* (2012.01)

(52) U.S. Cl.
CPC .............. *G06Q 40/00* (2013.01); *G06N 3/084* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 5,212,765 A * | 5/1993 | Skeirik | G05B 13/027 417/44.2 |
| 5,398,300 A | 3/1995 | Levey | |
| 6,119,103 A | 9/2000 | Basch et al. | |
| 6,247,001 B1 | 6/2001 | Tresp et al. | |
| 6,269,351 B1 | 7/2001 | Black | |
| 6,330,546 B1 | 12/2001 | Gopinathan et al. | |
| 6,782,375 B2 * | 8/2004 | Abdel-Moneim | G06N 3/02 706/15 |
| 7,357,298 B2 | 4/2008 | Pokorny et al. | |
| 7,711,615 B2 | 5/2010 | Walz et al. | |
| 7,954,698 B1 | 6/2011 | Pliha | |
| 8,108,327 B2 | 1/2012 | Krebs | |
| 8,185,909 B2 | 5/2012 | Sigal et al. | |
| 8,498,954 B2 | 7/2013 | Malov et al. | |
| 8,798,969 B2 | 8/2014 | Heidasch | |
| 2004/0093315 A1 | 5/2004 | Carney | |
| 2009/0018996 A1 | 1/2009 | Hunt et al. | |
| 2009/0106178 A1 * | 4/2009 | Chu | G06N 99/005 706/14 |
| 2009/0326998 A1 | 12/2009 | Watkins et al. | |
| 2012/0179598 A1 | 7/2012 | Roth | |
| 2012/0191630 A1 | 7/2012 | Breckenridge et al. | |
| 2013/0138554 A1 | 5/2013 | Nikankin et al. | |
| 2014/0279754 A1 * | 9/2014 | Barsoum | G06N 7/005 706/12 |

OTHER PUBLICATIONS

M. Handzic, F. Tjandrawibawa, and J. Yeo. How neuralnetworks can help loan officers to make better informed applications decisions,II in Proc. 2003 Informing Science+ IT Education Conference 2003, pp. 97-108.*

Eletter, Shorouq Fathi, Saad Ghaleb Yaseen, and Ghaleb Awad Elrefae. "Neuro-based artificial intelligence model for loan decisions." American Journal of Economics and Business Administration 2.1 (2010): 27-34.*

(Continued)

*Primary Examiner* — Stanley K Hill
*Assistant Examiner* — David H Kim

(57) ABSTRACT

Various embodiments of systems and methods to dynamically retrain prediction models based on real time transaction data are described herein. In one aspect, real time application data and status data associated with an entity are obtained. The obtained application data is inputted to a prediction model to produce an assessment of a risk. The obtained status data with the assessed risk are compared. When the obtained payment status data does not match the determined risk, the prediction model is retrained.

20 Claims, 5 Drawing Sheets

(56) References Cited

OTHER PUBLICATIONS

Madeira, Sara C., Arlindo L. Oliveira, and Catarina S. Conceiçao. "A data mining approach to credit risk evaluation and behaviour scoring." Progress in Artificial Intelligence. Springer Berlin Heidelberg, 2003. 184-188.*

Serrano C; Self Organizing Neural Networks for Financial Diagnosis; Decision Support Systems; Jul. 1996; p. 227-238; vol. 17; issue 3; Emerald Insight, Bingley, United Kingdom (http://cherubino.emeraldinsight.com/vl=43088773/cl=9/nw=1/rpsv/cgi-bin/emeraldce).

* cited by examiner

DYNAMICALLY RETRAINING A PREDICTION MODEL BASED ON REAL TIME TRANSACTION DATA

BACKGROUND

Prediction models are applied to predict future trends or behavior patterns (e.g., a risk of default) from given input data. Typically, a prediction model is trained with transaction data associated with entities for achieving better operational efficiencies, reducing fraudulent transactions and the like. Often, the amount of transactional data is significantly large (e.g., in terabytes and gigabytes) and changes frequently (e.g., daily). Therefore, the process of training the prediction model could be time consuming, and it may be difficult to regularly check the accuracy of the prediction model. Further, training the prediction model periodically (e.g., monthly) may not be accurate since the transaction data used to train the prediction model may become old (e.g., by a month) and relying on old transaction data might be risky.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to dynamically retrain a prediction model based on real time transaction data are described herein. Prediction models are mathematical models that establish co-relations between parameters that affect an outcome. According to various embodiments, the prediction models are built by analyzing transaction data (e.g., historical transaction data) and the relationships between the influencing parameters and the output is derived to predict future trends or behavior patterns. Further, the transaction data (e.g., input data) can be referred as training data associated with entities. An entity can be an individual, a group of people, a company, group of companies, etc. Further, the prediction model can then be used to predict the output for any new set of influencing parameters (e.g., the parameters for a new customer).

Initially, the prediction model is trained using training data (e.g., historical transaction data) associated with the entities. Training the prediction model involves scrutinizing the historical transaction data and establishing a relationship between the influencing parameters and the output. In one exemplary embodiment, transaction data includes application data consisting of parameters influencing a risk and status data defining status of deferral of payment. Subsequently, in one embodiment, when real time transaction data (e.g., application data and status data) associated with an entity is received, the risk outcome as outputted by the prediction model corresponding to the received application data is checked. Further, when the risk outcome as output by the prediction model does not match with the received payment status data, the prediction model is dynamically retrained using the received real time transaction data. The real time transaction data can be a new transaction data or a change in the existing transaction data associated with the entity. In other words, when the relationship between the influencing parameters and the output does not match due to a change in a pattern of the transactional data, then the prediction model is retrained. Retraining can be defined as re-establishing the relationship between the influencing parameters and the output to account for the new pattern of changed transaction data.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
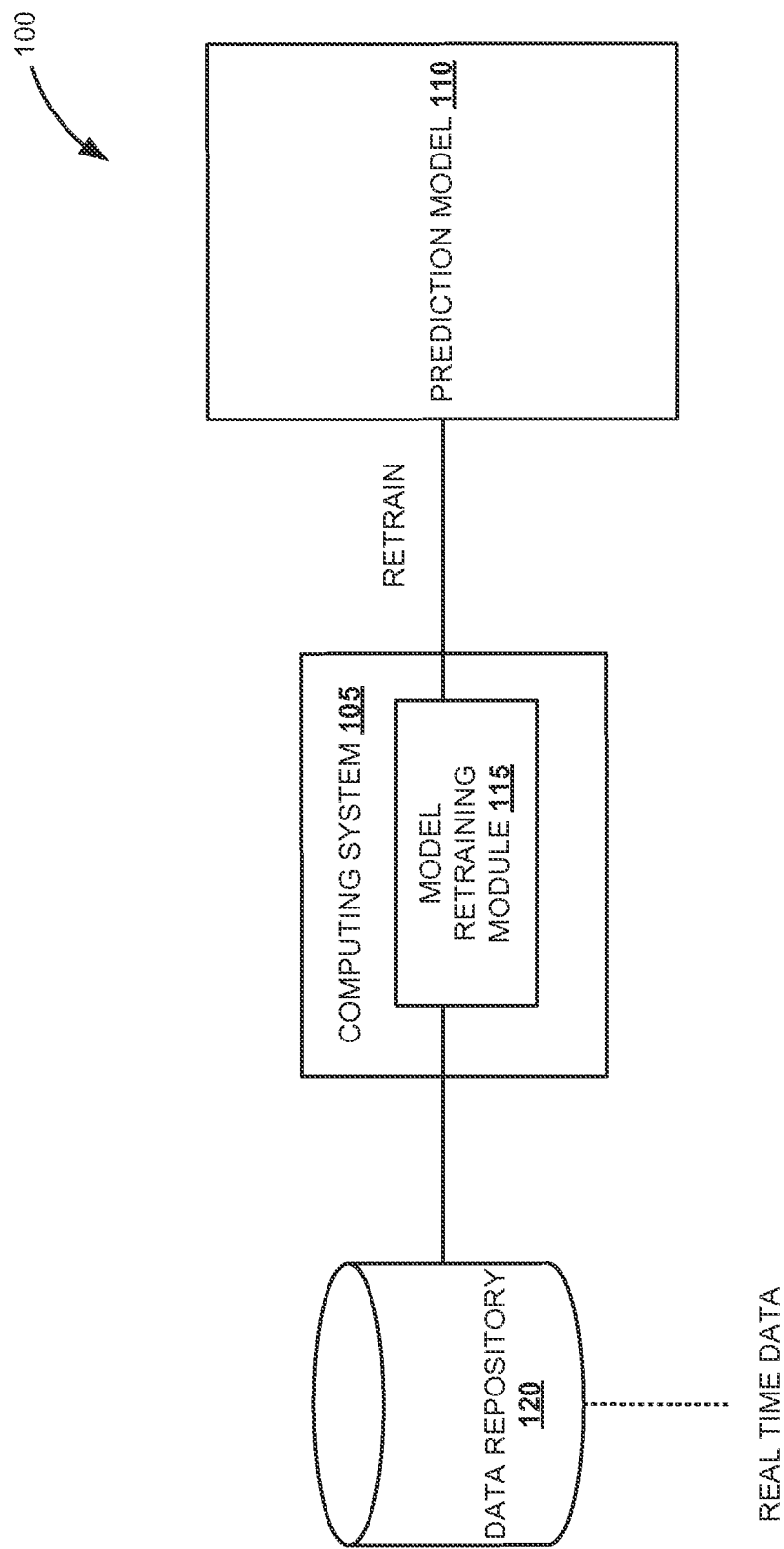
FIG. 1 is a block diagram of a computing environment illustrating a computing system to dynamically retrain a prediction model based on real time transaction data, according to an embodiment.

FIG. 1 is a block diagram of computing environment 100 illustrating computing system 105 to dynamically retrain prediction model 110 based on real time transaction data, according to an embodiment. The computing system 105 includes model retraining module 115 to determine when to retrain the prediction model 110 based on the real time transaction data.

Data repository 120 stores historical transaction data and real time transaction data associated with entities, providing insights about trends and behavior of the entities. The real time transaction data and/or the historical transaction data is used to train and/or retrain the prediction model 110. In one exemplary embodiment, the data repository 120 is an in-memory computer system. The transaction data includes application data and status data of different entities involved in business transactions. For example, the application data may include risk related parameters such as, but not limited to, income level, number of existing loans, number of early payoffs done by an entity, payment plan change, skip of payments pertaining to existing loan, extension of a loan, and age of an entity. The status data may define whether an entity has defaulted loan.

Initially, the prediction model 110 may be trained with the historical transaction data stored in the data repository 120. Future behavior patterns can be predicted by the prediction model 110 for various purposes such as launch a new product/service on the market, understanding and anticipating trends of the market, better operational efficiencies, reducing operational risks and fraudulent transactions, predicting a risk of default, etc.

The transaction data associated with the entities can change over time. Therefore, it is advantageous to retrain the prediction model using real time transaction data. Accordingly, in one embodiment, the model retraining module 115 retrains the prediction model 110 based on the real time transaction data to keep the prediction model 110 updated.

Figure 2:
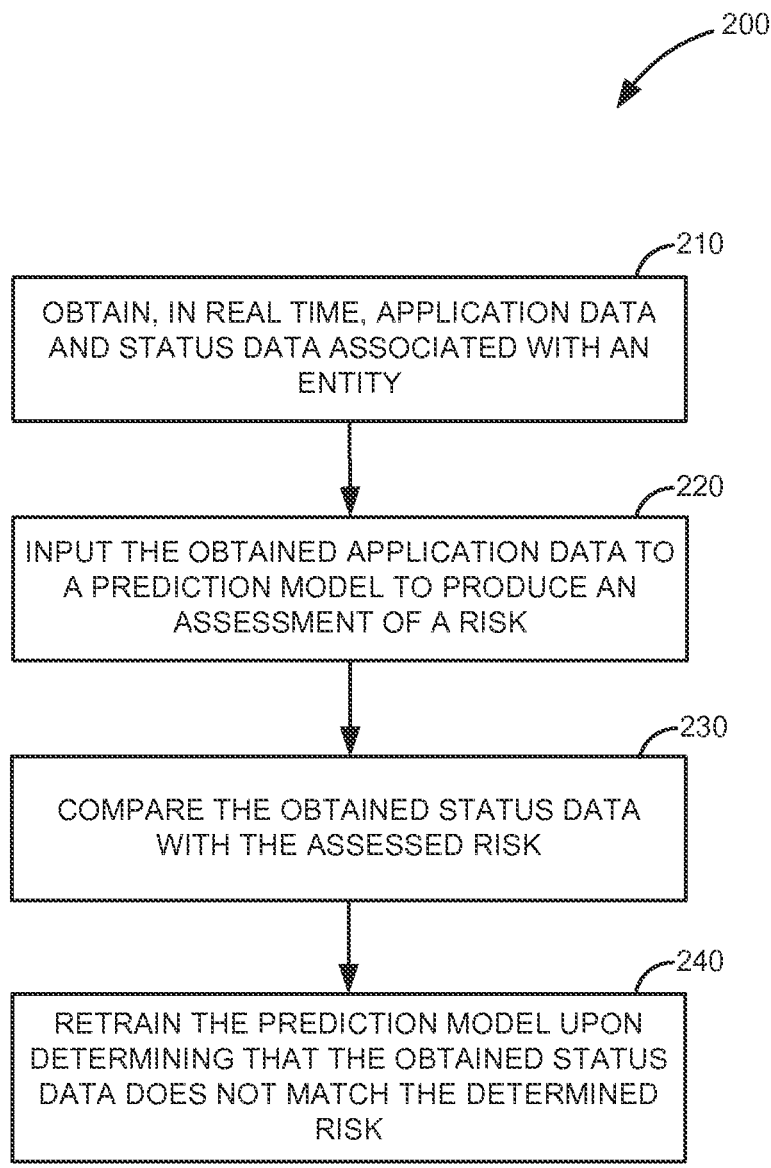
FIG. 2 is a flow diagram illustrating a process to dynamically retrain a prediction model based on real time transaction data, according to an embodiment.

FIG. 2 is a flow diagram illustrating process 200 to dynamically retrain a prediction model based on real time transaction data, according to an embodiment. Process 200 is described with respect to prediction model including an artificial neural network (ANN) to assess a risk of default. For example, consider an existing customer of a bank. Initially, with the customer's transaction data, the customer risk prediction was determined as positive and a loan was sanctioned to the customer. Currently, the customer defaults on his loan due to some reason. The prediction model learns and incorporates the new behavior. Incorporating the new behavior is achieved by retraining the prediction model.

Process 200 can be implemented in other models such as, but not limited to, prediction model built using classification tree, regression model, economic model, econometric model, forecasting model, decision support model, estimation model and projection model. Also, the process 200 can be applied to other scenarios such as, but not limited to share market and pattern recognition.

At 210, real time application data and status data (e.g., real time transaction data) associated with an entity are obtained. In one embodiment, the application data includes a number of parameters or factors affecting a risk as shown in Table 1:

TABLE 1

| Input node | Parameter | Values |
|---|---|---|
| X1 | Income level | High/medium income = 1<br>Low income = 0 |
| X2 | Existing loans | No existing loans = 1<br>Greater than or equal to 1 = 0 |
| X3 | Early payoff | Yes = 1<br>No = 0 |
| X4 | Payment plan change | Yes = 0<br>No = 1 |
| X5 | Extension of a payment | Yes = 0<br>No = 1 |
| X6 | Renewal of loan | Yes = 0<br>No = 1 |
| X7 | Age of a customer | Less than 40 = 1<br>More than 40 = 0 |
| X8 | Type of occupation | Salary = 1<br>Business = 0 |
| X9 | Number of months for term end of current active loans | Less than 12 = 1<br>More than 12 = 0 |
| X10 | Deferral of payments for existing loans | Yes = 0<br>No = 1 |

In one embodiment, the parameters are interdependent. For example, the income level and the age of the customer can be interdependent as the income level may increase with the age. Further, the status data defines any payment deferral or overdue or delinquency of a loan.

At 220, the obtained application data is inputted to a prediction model to produce an assessment of a risk. In one embodiment, obtained application data is transformed into binary for simplicity. For example, an entity having a high or medium income is given value "1" and an entity having a low income is given value "0". Similarly binary values are assigned to each parameter as specified in Table 1. Further, the application data (e.g., parameters) are inputted to the prediction model.

Figure 3:
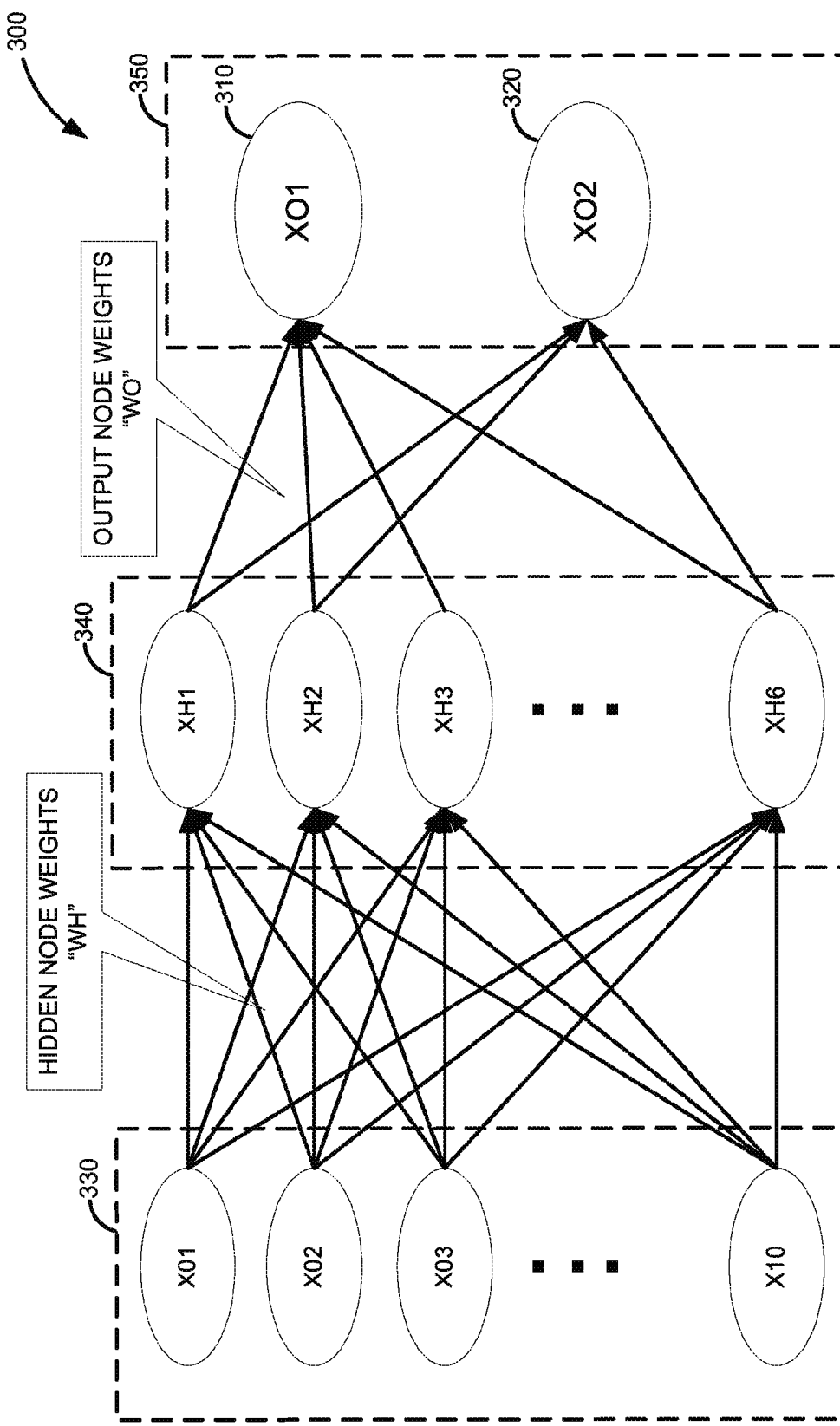
FIG. 3 is a block diagram illustrating an exemplary prediction process, according to an embodiment.

Exemplary prediction model 300 built using ANN is depicted in FIG. 3. The ANN is used to solve a class of problems that involve a plurality of input parameters and interdependency between them. The ANN consists of multiple layers. A first layer is an input layer (e.g., 330) and a last layer is an output layer (e.g., 350). In between the first layer and the last layer, there can be one or more hidden layers. One hidden layer 340, for instance, is depicted in FIG. 3. The number of hidden layers required depends on the complexity of the problem solved using ANN, and also on the nature of the output. The number of nodes in a hidden layer is equal to or more than the arithmetic mean of the number of nodes on either side of the layer. In FIG. 3, the number of hidden nodes is equal to or more than (10+2)/2=6 (e.g., XH1 to XH6).

The application data (e.g., parameters depicted in Table 1) are inputted to the prediction model 300 through input nodes (e.g., X01 to X10). The connections between the input nodes (e.g., X01 to X10) to hidden nodes (e.g., XH1 to XH6) of hidden layer are referred as hidden nodes weights "WH". Further, the connections between the hidden nodes (e.g., XH1 to XH6) and output nodes (e.g., XO1 and XO2) of the output layer are referred as output node weights "WO". Initially, while training the prediction model, the "WH" and "WO" are calculated based on the transaction data (e.g., historical transaction data including application data and loan default data of customers). In one exemplary embodiment, the hidden nodes (e.g., XH1 to XH6) and the output nodes (XO1 and XO2) are computed using below Equations (1A), (1B), (2A) and (2B) (e.g., sigmoid function). Further, the values of "WH" and "WO" may be adjusted by a trial and error method till the values of the output nodes (e.g., XO1 and XO2) match with the historical transaction data.

$$\text{sum(hidden)} = \sum (\text{Input node} * WH) \qquad (1A)$$

$$\text{Hidden node} = \frac{1}{(1 + \hat{e}(-1 * \text{sum(hidden)}))} \qquad (1B)$$

$$\text{sum(output)} = \sum (\text{Hidden node} * WO) \qquad (2A)$$

$$\text{Output node} = \frac{1}{(1 + \hat{e}(-1 * \text{sum(output)}))} \qquad (2B)$$

For example, calculating the hidden nodes (e.g., XH1 to XH6) and the output nodes (e.g., XO1 and XO2) using the Equations (1A), (1B), (2A) and (2B) are depicted in Tables 2-6. Table 2 depicts number of input nodes and corresponding values. Table 3 depicts the hidden nodes weights "WH". Table 4 depicts number of hidden nodes and corresponding values. Table 5 depicts the output node weights "WO". Table 6 depicts the number of output nodes and corresponding values.

TABLE 2

| Input Nodes | 1 | 2 | 3 | 4 | 5 | 6 | 7 | 8 | 9 | 10 |
|---|---|---|---|---|---|---|---|---|---|---|
| Value | 1 | 1 | 1 | 1 | 1 | 1 | 1 | 1 | 1 | 1 |

TABLE 3

| | | Hidden Nodes | | | | | |
|---|---|---|---|---|---|---|---|
| | | 1 | 2 | 3 | 4 | 5 | 6 |
| Input<br>Nodes | 1 | −0.80 | −0.74 | −0.79 | −1.05 | −1.16 | 1.78 |
| | 2 | −1.20 | −1.19 | 0.40 | −1.09 | −1.19 | −0.57 |
| | 3 | −1.06 | −0.87 | −0.99 | −1.14 | 6.12 | −0.96 |
| | 4 | −1.12 | −1.47 | −0.40 | −1.23 | −0.85 | −0.60 |
| | 5 | 4.67 | −1.30 | −1.71 | −0.81 | −1.2 | −1.38 |
| | 6 | −0.76 | −1.15 | −0.30 | −1.34 | −1.19 | 0.04 |
| | 7 | −1.24 | −1.11 | 3.77 | 4.78 | −1.58 | −1.43 |

TABLE 3-continued

| | Hidden Nodes | | | | | |
|---|---|---|---|---|---|---|
| | 1 | 2 | 3 | 4 | 5 | 6 |
| 8 | −1.06 | −0.86 | −0.84 | −1.14 | −1.34 | 1.32 |
| 9 | −1.00 | −0.62 | −1.27 | −0.67 | −1.54 | −1.87 |
| 10 | −1.08 | 4.75 | −1.47 | −0.69 | −1.43 | −1.78 |
| WH | −4.68 | −4.60 | −4.43 | −4.41 | −5.40 | −5.47 |

TABLE 4

| Hidden Nodes | 1 | 2 | 3 | 4 | 5 | 6 |
|---|---|---|---|---|---|---|
| Value | 0.0091 | 0.0098 | 0.0116 | 0.0118 | 0.0044 | 0.0041 |

TABLE 5

| | | Output Node | |
|---|---|---|---|
| | | 1 | 2 |
| Hidden Nodes | 1 | −5.02 | 5.04 |
| | 2 | −5.05 | 5.04 |
| | 3 | −4.84 | 4.76 |
| | 4 | −4.86 | 5.02 |
| | 5 | −5.85 | 5.84 |
| | 6 | −4.56 | 4.67 |
| WO | | 7.02 | −7.04 |

TABLE 6

| | Output Nodes | |
|---|---|---|
| | 1 | 2 |
| Value | 0.9991 (Not Risky) | 0.0008 (Risky) |

In the example, if the output node is more than numeric value of 1 then a first output node 310 fires, otherwise the second output node 320 fires. Firing of the first output node 310 is interpreted as a non-risky prediction while the firing of the second output node 320 is interpreted as a risky prediction. The prediction model 300 may be used to assess the risk of default based on the inputted real time application data. In the example, upon determining that the first output node 310 fires for the real time application data, the assessed risk is returned as a non-risky prediction.

At 230, the obtained status data is compared with the assessed risk. For example, consider the obtained payment status data indicate that the customer has defaulted the loan. The assessed risk of default as outputted by the prediction model indicates non-risky prediction for the application data. Therefore, the obtained payment status data and the assessed risk of default do not match.

At 240, the prediction model is retrained upon determining that the obtained status data does not match the determined risk. When the obtained status data match with the determined risk, the prediction model is retained. In the example, the prediction model 300 may be retrained based on the obtained real time application data and the payment status data. The pre-condition for retraining the prediction model may be a change in transaction data that has resulted in defaulting of a loan though the prediction is positive (also, vice versa). Thus, the risks are predicted for real time transaction data and corrective actions can be timely taken before the risk increases or becomes an issue.

Figure 4:
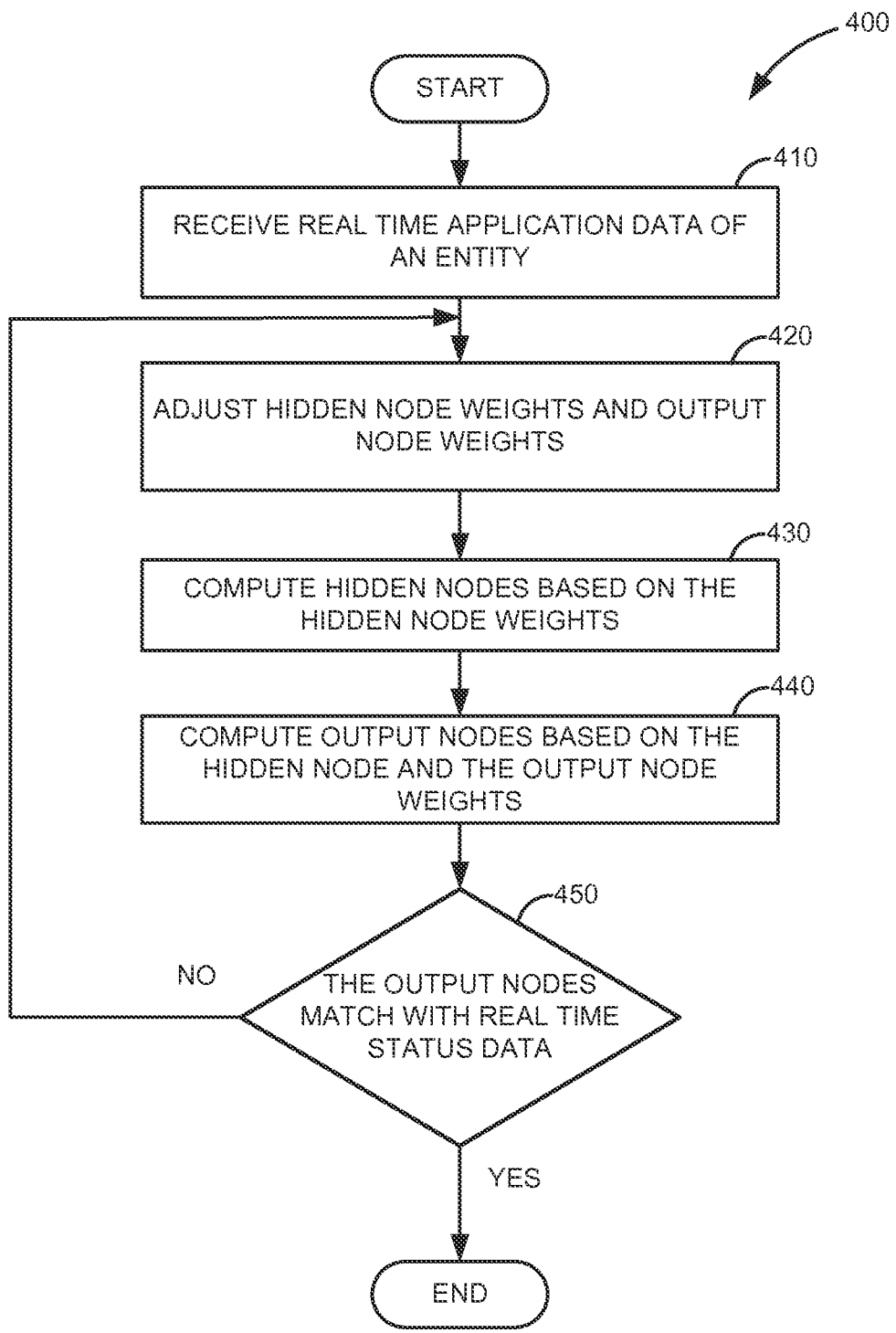
FIG. 4 is a flow diagram illustrating a process to retrain a prediction model based on real time transaction data, according to an embodiment.

FIG. 4 is a flow diagram illustrating a process 400 to retrain a prediction model based on real time transaction data, according to an embodiment. The real time transaction data includes application data and status data associated with an entity. At 410, real time application data of an entity are received. At 420, hidden node weights "WH" and output node weights "WO" are adjusted based on the real time application data. At 430, hidden nodes are computed based on the hidden node weights using Equations (1A) and (1B). At process block 440, output nodes are computed based on the hidden nodes and the output node weights using Equation (2A) and (2B).

At 450, a check is performed whether the output nodes match the real time status data. When the output nodes do not match the status data, hidden node weights "WH" and output node weights "WO" are again adjusted to new values and the hidden nodes and the output nodes are computed. The adjusting the hidden node weights "WH" and the output node weights "WO" is performed until the output nodes match the status data and thus, the prediction model is retrained. The hidden node weights "WH" and the output node weights "WO" may be adjusted based on calculated error between the output nodes and the status data.

Whenever real time transaction data is received at a data repository, a check of the prediction model may be triggered. When the prediction does not match with the real time transaction data (e.g., a customer may have defaulted despite being predicted as low risk or vice versa), then the prediction model requires re-training to account for this change of behavior. Thus, the prediction model may be kept current with respect to transactional data asynchronously, and no manual intervention may be necessary.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
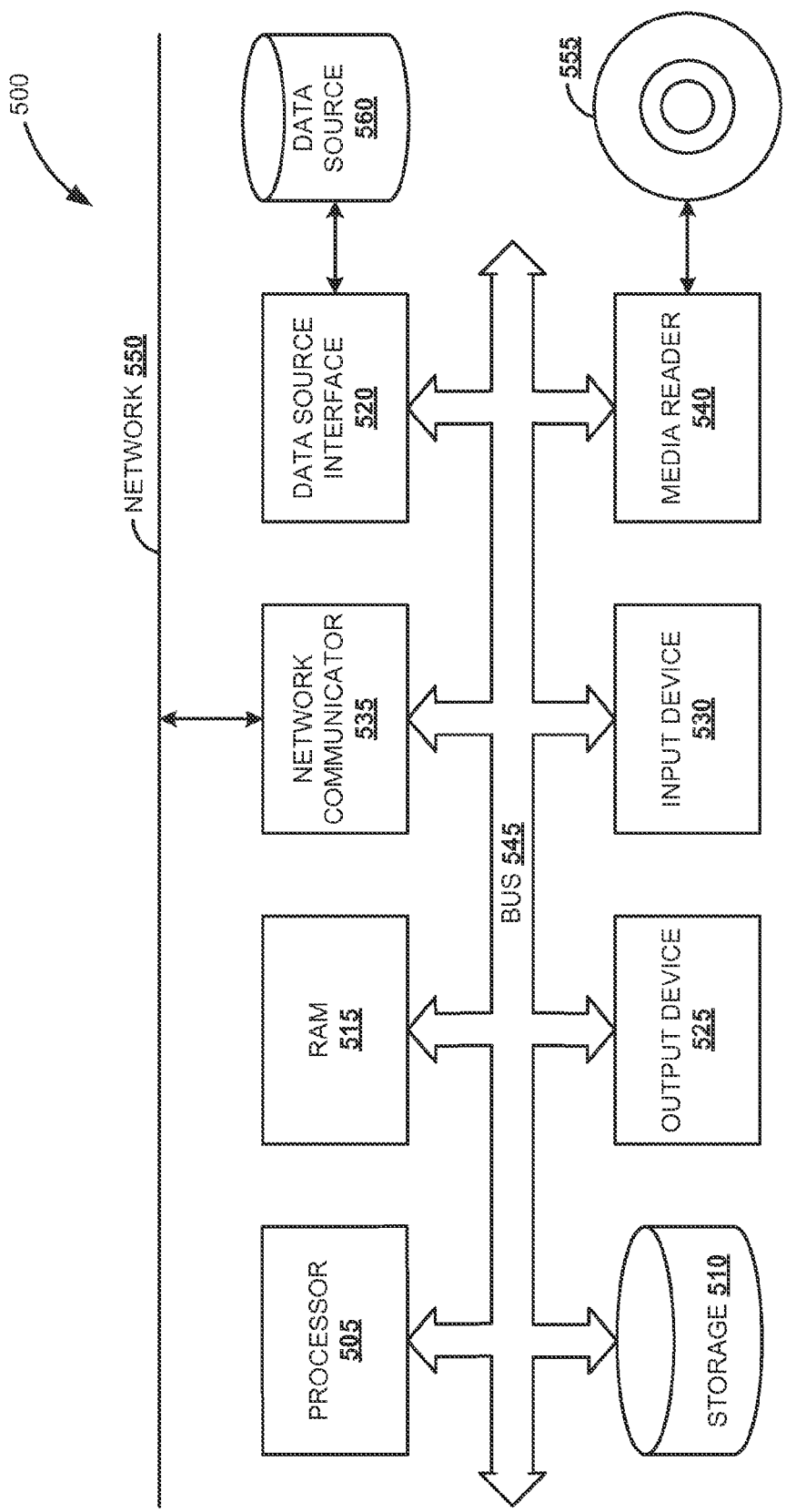
FIG. 5 is a block diagram of an exemplary computer system, according to an embodiment.

FIG. 5 is a block diagram of an exemplary computer system 500. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, all of the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed cause a computer system to perform operations comprising:
    obtain, in real time, application data and status data associated with an entity;
    input the obtained real time application data to a prediction model to produce an assessment of a risk, wherein the prediction model is initially trained based on historical application data and corresponding status data;
    compare the obtained real time status data with the assessed risk; and
    retrain the prediction model based on the obtained real time application data and the status data upon determining that the obtained real time status data does not match the assessed risk, wherein retraining the prediction model comprises adjusting hidden node weights and output node weights of the prediction model based on the obtained real time application data.

2. The non-transitory computer-readable medium of claim 1, wherein the real time application data comprises a plurality of parameters and corresponding values affecting the risk.

3. The non-transitory computer-readable medium of claim 2, wherein the plurality of parameters are interdependent.

4. The non-transitory computer-readable medium of claim 1, wherein the real time status data comprises status of deferral of payment associated with the real time application data.

5. The non-transitory computer-readable medium of claim 1, wherein the prediction model comprises an artificial neural network.

6. The non-transitory computer-readable medium of claim 1, wherein the historical application data and the corresponding status data is associated with a plurality of entities.

7. The non-transitory computer-readable medium of claim 1, wherein retraining the prediction model comprises:
    receiving the obtained real time application data;
    adjusting the hidden node weights and the output node weights of the prediction model based on the obtained real time application data;
    computing output nodes of the prediction model based on the initialized hidden node weights and the output node weights;
    comparing whether the output nodes match with the obtained real time status data; and
    retraining the prediction model by reinitializing the hidden node weights and the output node weights, and computing the output nodes until the output nodes match with the obtained real time status data.

8. A computer implemented method to dynamically retrain a prediction model based on real time transaction data using a computer, the method comprising:
    obtaining, in real time, application data and status data associated with an entity;
    inputting the obtained real time application data to the prediction model to produce an assessment of a risk, wherein the prediction model is initially trained based on historical application data and corresponding status data;
    the computer, comparing the obtained real time status data with the assessed risk; and
    the computer, retraining the prediction model based on the obtained real time application data and the status data upon determining that the obtained real time status data does not match the assessed risk, wherein retraining the prediction model comprises adjusting hidden node weights and output node weights of the prediction model based on the obtained real time application data.

9. The computer implemented method of claim 8, wherein the real time application data comprises a plurality of parameters and corresponding values affecting the risk.

10. The computer implemented method of claim 9, wherein the plurality of parameters are interdependent.

11. The computer implemented method of claim 8, wherein the real time status data comprises status of deferral of payment associated with the real time application data.

12. The computer implemented method of claim 8, wherein the prediction model comprises an artificial neural network.

13. The computer implemented method of claim 8, wherein the historical application data and the corresponding status data is associated with a plurality of entities.

14. The computer implemented method of claim 8, wherein retraining the prediction model comprises:
    receiving the obtained real time application data;
    adjusting the hidden node weights and the output node weights of the prediction model based on the obtained real time application data;
    computing output nodes of the prediction model based on the initialized hidden node weights and the output node weights;
    comparing whether the output nodes match with the obtained real time status data; and
    retraining the prediction model by reinitializing the hidden node weights and the output node weights, and computing the output nodes until the output nodes match with the obtained real time status data.

15. A computer system to dynamically retrain a prediction model based on real time transaction data, the computer system comprising:
    at least one processor; and
    one or more memory devices communicative with the at least one processor, wherein the one or more memory devices store instructions to:
        obtain, in real time, application data and status data associated with an entity;
        input the obtained real time application data to the prediction model to produce an assessment of a risk, wherein the prediction model is initially trained based on historical application data and corresponding status data;
        compare the obtained real time status data with the assessed risk; and
        retrain the prediction model using the obtained real time application data and the status data upon determining that the obtained real time status data does not match the assessed risk, wherein retraining the prediction model comprises adjusting hidden node weights and output node weights of the prediction model based on the obtained real time application data.

16. The computer system of claim 15, wherein the real time application data comprises a plurality of parameters and corresponding values affecting the risk.

17. The computer system of claim 16, wherein the plurality of parameters are interdependent.

18. The computer system of claim 15, wherein the real time status data comprises status of deferral of payment.

19. The computer system of claim 15, wherein the prediction model comprises an artificial neural network.

20. The computer system of claim 15, wherein retraining the prediction model comprises:
    receiving the obtained real time application data;
    adjusting the hidden node weights and the output node weights of the prediction model based on the obtained application data;
    computing output nodes of the prediction model based on the initialized hidden node weights and the output node weights;
    comparing whether the output nodes match with the obtained real time status data; and
    retraining the prediction model by reinitializing the hidden node weights and the output node weights, and computing the output nodes until the output nodes match with the obtained real time status data.

* * * * *